United States Patent
Magnitakil et al.

(10) Patent No.: US 6,500,602 B1
(45) Date of Patent: Dec. 31, 2002

(54) PRODUCTION OF OPTICAL RECORDING MEDIA HAVING PLURAL LUMINESCENT RECORDING LAYERS BY EMBOSSING THE RECORDING LAYER

(75) Inventors: Sergei A. Magnitakil, Moscow (RU); A. Lezhnev, Moscow (RU); Vladimir V. Shubin, Moscow (RU); Eugene V. Levich, New York, NY (US)

(73) Assignee: TriD Store IP LLC, New York, NY (US)

( * ) Notice: Subject to any disclaimer, the term of this patent is extended or adjusted under 35 U.S.C. 154(b) by 0 days.

(21) Appl. No.: 09/646,299

(22) PCT Filed: Mar. 18, 1999

(86) PCT No.: PCT/US99/05857

§ 371 (c)(1),
(2), (4) Date: Oct. 23, 2000

(87) PCT Pub. No.: WO99/47327

PCT Pub. Date: Sep. 23, 1999

Related U.S. Application Data

(60) Provisional application No. 60/078,514, filed on Mar. 18, 1998.

(51) Int. Cl.[7] ............................. B29C 17/00; B29C 1/04
(52) U.S. Cl. ................... 430/321; 430/945; 430/320; 205/70; 205/68; 264/1.33; 264/1.36; 264/1.7; 264/2.5; 156/242; 156/247
(58) Field of Search ................... 430/320, 321; 205/68, 70; 269/275.4, 277; 264/1.31, 1.33, 1.7, 2.5, 1.36; 156/242, 247

(56) References Cited

U.S. PATENT DOCUMENTS

| | | | |
|---|---|---|---|
| 3,875,024 A | 4/1975 | Picquendar et al. | 204/5 |
| 4,090,031 A | 5/1978 | Russell | 358/130 |
| 4,251,610 A | 2/1981 | Haven et al. | 430/25 |
| 4,259,433 A | 3/1981 | Mizobuchi et al. | 430/296 |
| 4,965,153 A | 10/1990 | Imataki et al. | 430/11 |
| 4,980,262 A | 12/1990 | Thomas et al. | 430/141 |
| 5,447,767 A | 9/1995 | Tanabe et al. | 428/64.6 |
| 5,645,964 A | 7/1997 | Nohr et al. | 430/21 |
| 5,669,995 A | 9/1997 | Hong | 156/74 |

FOREIGN PATENT DOCUMENTS

| | | |
|---|---|---|
| JP | 60-29950 | 2/1985 |
| JP | 61-273759 | * 12/1986 |
| JP | 1-105343 | 4/1990 |
| JP | 4-246586 | 9/1992 |

OTHER PUBLICATIONS

Keizer—VideoDisc Mastering, RCA Review, vol. 39, 1978, pp. 58–86.

* cited by examiner

Primary Examiner—Martin Angebranndt
(74) Attorney, Agent, or Firm—Blank Rome Comisky & McCauley LLY

(57) ABSTRACT

Processes for producing the multi-layered optical recording medium shown in FIG. 2 using the embossing master (20) shown in FIG. 3, where an etched metal thin layer (22) has been electroplated with a thick metal layer and the luminescent recording layer (25) cast thereover forming pits (24) between adjacent metallized areas. The luminescent layer may then be cured using UV light (26).

25 Claims, 4 Drawing Sheets

20 - Multi-layered optical fluorescent disk
21 - Protective layer
22 - Adhesive layer
23 - Fluorescent pits in the ILM layer
24 - Separating layer
25 - Substrate
26 - Non-luminescent part of the ILM layer
I, II, III, ... N - the numbers of spearate multilayer structure 10 - Multilayer optical fluorescent disk 11 - Protective layer 12 - Glue (adhesive) layer 13 - Fluorescent pits in the adhesive layer 14 - Separating layer 15 - Substrate I, II, III, ... N - the numbers of spearate multilayer structure 20 - Multi-layered optical fluorescent disk 21 - Protective layer 22 - Adhesive layer 23 - Fluorescent pits in the ILM layer 24 - Separating layer 25 - Substrate 26 - Non-luminescent part of the ILM layer I, II, III, ... N - the numbers of spearate multilayer structure 30 - Master-disc 31 - Tmasparent substrate of the master-disc 32 - Thin metallic layer 33 - Thick metallic layer (plated by electrodeposition)

34 - Informative pit

35 - ILM layer

36 - UV light

40 - Master-disc

41 - Master-disc transparent substrate

42 - Thin metallic layer

43 - The layer increasing the wettability of ILM to the surface of the master-disc 44 - Thick metal layer accumulated by teh electroplating method 45 - Layer decreasing the wettability of ILM to the upper surface of the master-disc

PRODUCTION OF OPTICAL RECORDING MEDIA HAVING PLURAL LUMINESCENT RECORDING LAYERS BY EMBOSSING THE RECORDING LAYER

This is a National Phase Application of PCT/US99/05857 filed Mar. 18, 1999, which in turn claims priority of U.S. Provisional Application Serial No. 60/078,514, filed Mar. 18, 1998.

FIELD OF INVENTION

The present invention relates to the production technology of the CD-ROM-, WORM-, WER-class multi-layered optical discs. More particularly, it refers to the methods of replication of the multi-layered optical discs by using the relief-carrying master-discs produced by the technology similar to the contact lithography, as well as to the relief-carrying master-discs with various wetting properties on their surface and in the micro-cavities (pits and grooves), as well as to the liquid light-sensitive compositions of the informative luminescencing media for implementation of the said methods.

The inventive method has advantages, which enable the production of polychrome discs, and thus increase the information. capacity of the discs a few times (approximately, by the number of times equal to the number of chromatic components utilized in a polychrome disc).

References
US and other foreign patent documents

| | | | |
|---|---|---|---|
| 3,946,367 | 3/1976 | | |
| 4,219,704 | 8/1980 | | |
| 4,450,553 | 5/1984 | | |
| 4,905,215 | 2/1990 | | |
| 4,908,813 | 3/1990 | | |
| 5,063,556 | 11/1991 | | |
| 5,202,875 | 4/1993 | | |
| 5,251,198 | 10/1993 | | |
| 5,255,262 | 10/1993 | | |
| 5,373,499 | 3/1995 | | |
| 5,381,401 | 1/1995 | | |
| 5,408,453 | 4/1995 | | |
| 5,468,324 | 11/1995 | | |
| 5,526,338 | 6/1996 | | |
| 5,540,966 | 7/1996 | | |
| 5,555,537 | /1996 | | |
| 5,669,995 | 9/1997 | | |
| 4,451,914 | /1984 | | |
| 4,829,505 | /1989 | | |
| 4,908,813 | /1990 | | |
| 5,134,604 | /1992 | | |
| 5,175,720 | /1992 | | |
| 5,218,599 | /1992 | | |
| 5,220,556 | /1993 | | |
| 5,285,974 | /1993 | | |
| 5,513,170 | /1996 | | |
| 5,511,057 | /1996 | | |
| 5,526,336 | /1996 | | |
| 5,526,338 | /1996 | | |
| 1078060 | 5/1980 | Canada | 352/32 |
| 0461956 | 12/1991 | European Patent Office | G11B 7/00 |
| 60-202545 | 10/1985 | Japan | G11B 7/00 |
| 62-271236 | 11/1987 | Japan | G11B 7/14 |
| 63-276732 | 11/1987 | Japan | G11B 13/00 |
| 63-3116548 | 5/1987 | Japan | G11B 7/09 |

Other Publications

1. N. K. Arter et al., "Optical Disc Family", IBM Technical Disclosure Bulletin, 30, N2, p.667, 1987.
2. S. Brown, "The decade of the CD", San Jose Mercury News, p.8, Jan. 9, 1994.
3. Y.Okino et al., "Developments in fabrication of optical discs", Optical Disc Technology, p.236, 1982.
4. S. Horigome, "Novel stamper process for optical disc", Optical Storage Technology, p.121, 1988.

BACKGROUND

Multi-layered fluorescent optical discs can find wide use owing to the possibility of reaching high bulk density when recording information on them, as well as of retrieving the information with high contract and signal-to-noise ratio.

For this purpose it is desirable to locate a luminescence-emitting information medium only in the pits of CD-ROM or in the pre-recording grooves of CD-WORM or CD-WER. In the present invention, this problem is resolved by using the photolithography technology, or specific types of original master-discs.

Use of contact photolithography to record elements with the resolution as defined in standards for the polycarbonate-base CD is rather difficult, since it is necessary to provide spaces less than $0.2\mu$ between the photomask and disc surfaces. The disc surface has a roughness of the order of few microns; moreover, disc thickness can vary gradually by tens of microns. As a result, it is impossible to press the disc to photomask uniformly all over the surface.

By means of modern lithographic devices with adaptive-optics projectors, it is possible to create the required recording elements, but only not on very large disc surfaces; in addition, the projector optics must be adjusted separately when recording each region, and that requires a lot of time and creates problems with recording at the borders of such regions. Besides, these devices are very expensive.

SUMMARY

In one embodiment of the present invention, the master-disc is made not in the form of a one-piece solid metal disc with pits or pre-recording grooves, but as a metallic-coated photomask formed on a transparent base, and by using the photolithographic methods for forming pits and pre-recording grooves.

I. Methods of Production of Thin Information Layers

The essence of the methods consists in applying an information layer directly on photomask with a subsequent removal from it after exposure through metal (1) or without exposure (2). This enables getting rid of the diffraction-related spreading of element images and their non-uniformity over the surface, which are inherent in contact photolithography and are caused by a gap between photomask and photoresist due to a roughness of their surface or non-uniformity when pressing down. The application of the information layer can be carried out by various methods, including spin-coating.

As the information layer, the following systems can be used:

1. A fluorescent dye in a light-sensitive composition (photopolymer, oligomer, monomer). When exposed to UV-radiation, polymerization take place only in pits (grooves), then non-polymerized sites are removed by washing them off by means of appropriate solvents.
2. The mixture of low-molecular polymer with photo-active dye. As the photo-active dyes, the following substances may be used:
   a) Lactams [2] and lactones of rhodamines and other organic dyes [3]. When exposed to $\lambda_1$-wavelength radiation, they pass to the colored structure which absorbs the radiation at the $\lambda_2$-wavelength and emits fluorescence rays on the $\lambda_3$-wavelength;
   b) Industrially manufactured photo-affined fluorescent labeles attached by the UV radiation to polymer molecules, for example, dye azides such as cascade blue or lucifer yellow AB and so on [4], which can be fastened to amine groups of gelatin or other polymers containing these groups, and so on with a subsequent washout of non-fastened dye molecules.

Therefore, applying the information layer directly on the photomask enables minimization of dimensions of record elements and increase of disc information capacity; in addition, a simple process of exposure reduces the cost of a finished disc.

1. Production of Information Layer by the Photomask Method

When transferring the image of the information elements from the photomask into an information layer, it is very important to do this without changing their dimensions and location. We propose the method that avoids the distortions related to diffraction of light on the photomask perforations using a "deep" photomask. Its thickness is determined by a number of circumstances.

Figure 2:
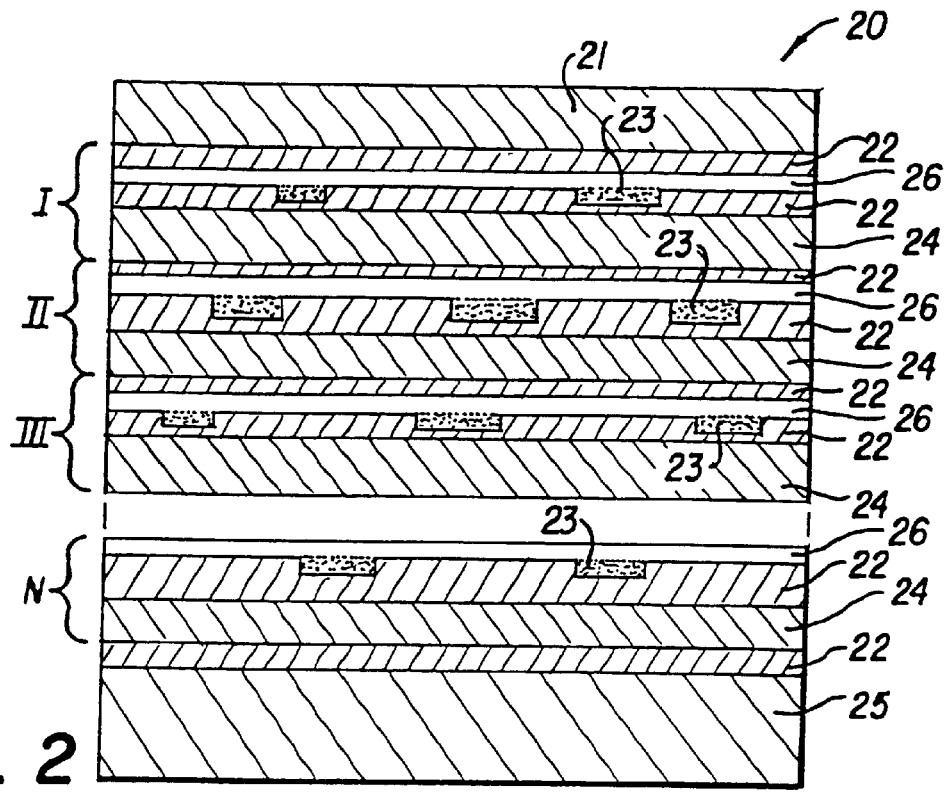
FIG. 2 is the same as FIG. 1, but when the ILM layer is not removed and contains no photo-chemically inactive luminophor.
Figure 3:
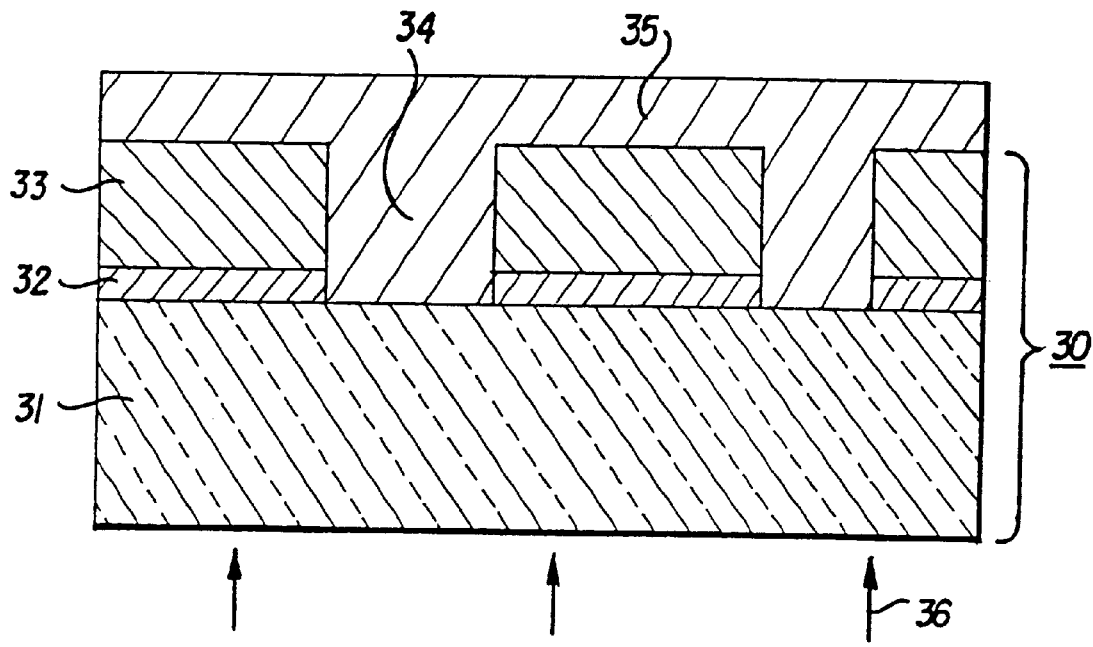
FIG. 3 is a schematic view of the master-disc used for replication of single-layered optical discs.

When being applied, the polymer will fill those sites on the photomask surface which are free of metal and will be poured in from above as a thin layer, thus filling in all the disc surface. When exposed from below, only the polymer sited inside the pit will pass into a colored form. When using photomask with the correctly selected composition, the depth of absorbed radiation in the material of the information layer 3 (FIG. 2) at exposure wavelength $\lambda_1$ can be made equal approximately to a the metal thickness. As a result, it is possible to avoid the effects of diffraction and, therefore, to decrease the pit dimensions.

The increased depth (as compared with the standard one) is necessary for increasing the information layer thickness to a possible maximum extent. It enables, under conditions of keeping the same amount of light absorption and, respectively, the number of molecules of dye (photochrome) in a pits, (a) to reduce heating by laser radiation during reading since the concentration of the photo-active molecules in a large volume is lower, and (b) to reduce the probability of aggregation of these molecules.

The dye concentration necessary to absorb 10% of incident radiation (in a linear range) for typical extinction coefficient ($\epsilon$) is calculated by the formula $C=-(1/\epsilon_d)\lg T$, where T indicates the transmittance. The dependency of the dye concentration, required to absorb 10% of the reading radiation in the pits with a depth of $d=0.1\mu$ and $d=0.5\mu$, on the extinction coefficient at the wavelength of the reading radiation, is given in Table 1.

TABLE 1

| $\epsilon$ (1/mole cm) d | $10^4$ | $2 \times 10^4$ | $5 \times 10^4$ | $10^5$ |
|---|---|---|---|---|
| $d = 0.1\mu$ | 0.458 | 0.228 | 0.0915 | 0.046 |
| $d = 0.5\mu$ | 0.0915 | 0.0456 | 0.0183 | 0.0092 |

With the molecular mass of the dye equal to 500, the dye must constitute from 22.9 to 2.29 percents (by volume) in the pits.

The given thickness of metal (the photomask depth) without loss of resolution can be provided if the photomask is made initially with a thin metal layer, the thickness of which is then enlarged by electroplating.

2. Production of the Information Layer by Masking

Figure 4:
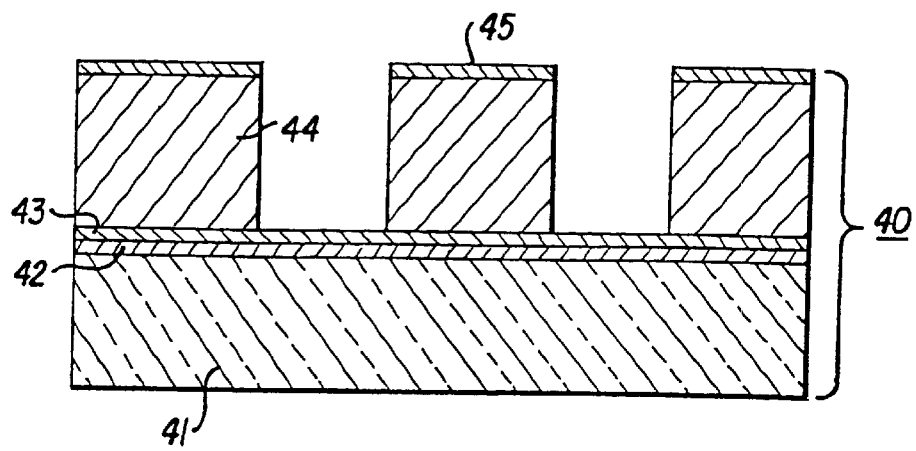
FIG. 4 is a schematic diagram of the master-disc as the second embodiment of the present invention.

It is proposed to use a master-disc which is made so that the pit bottom is wetted properly by the polymer of the information layer, and the surface of the disc is not wetted; in addition, in order to improve wettability, a special sublayer with a good wettability with respect to the polymer may be applied on the bottom of the pit. In this case, as the material for the information layer, the polymer with a fluorescent dye additive is used. By doing so, the solution of this polymer fills in only holes (pits). With the purpose to make the filling of pits much easier and to guarantee that the spaces between pits is not covered by the dye-containing polymer, the master-disc may be produced so that the basic mass of the master-disc is made of the material which exhibits a good wettability with respect to the solution of the dye-containing polymer, and the upper thin layer shows no wettability (see FIG. 4). As shown in FIG. 4, this layer may have a thickness equal to the required depth of pits, i.e. when producing the master-disc, only the thin layer will be etched, and the base of the master-disc will not be subjected to etching, but this layer may also be substantially thinner than the required depth of pits, with etching up to the required depth already in the material of the master-disc base. In any case, when producing pits, the through holes are etched in the thin layer. This thin layer is made of the material exhibiting a good adhesion with the material of the basic mass of the master-disc, but is not wettable by the polymer solution. After shaking off, blowing off, or blotting of the disc surface, on which the polymer solution with dye is applied, the drops of solution will remain only in the holes (pits) of the master-disc, and the rest of the surface will contain no polymer solution with dye.

After being dried without removing completely the tracks of the solvent, the hardened islands of the dye-containing polymer film, which fill the pits, shall still keep a sufficient adhesion with the bottom of the pits.

B. Production of the Optical Disc by Sticking Thin Multi-layered Information Structures One to the Other Sequentially On the information layer produced by the above-mentioned methods, a separation layer of a thickness of 5–100 $\mu$m and made of a pure polymer, or a polymer with a substance capable of absorbing the UV-radiation, is applied. This substance may be needed for protecting the dye against bleaching on exposure to the UV-radiation, which may be used for hardening of the photo-polymer glue. The glue is applied on the surface of the separation layer by a thin layer, for example, by using a centrifuge. Then, by means of the applied glue, the resultant multi-layered structure is glued to a mechanical base above the multi-layered information structures, applied previously; as the mechanical base, a polycarbonate disc may be used.

Figure 1:
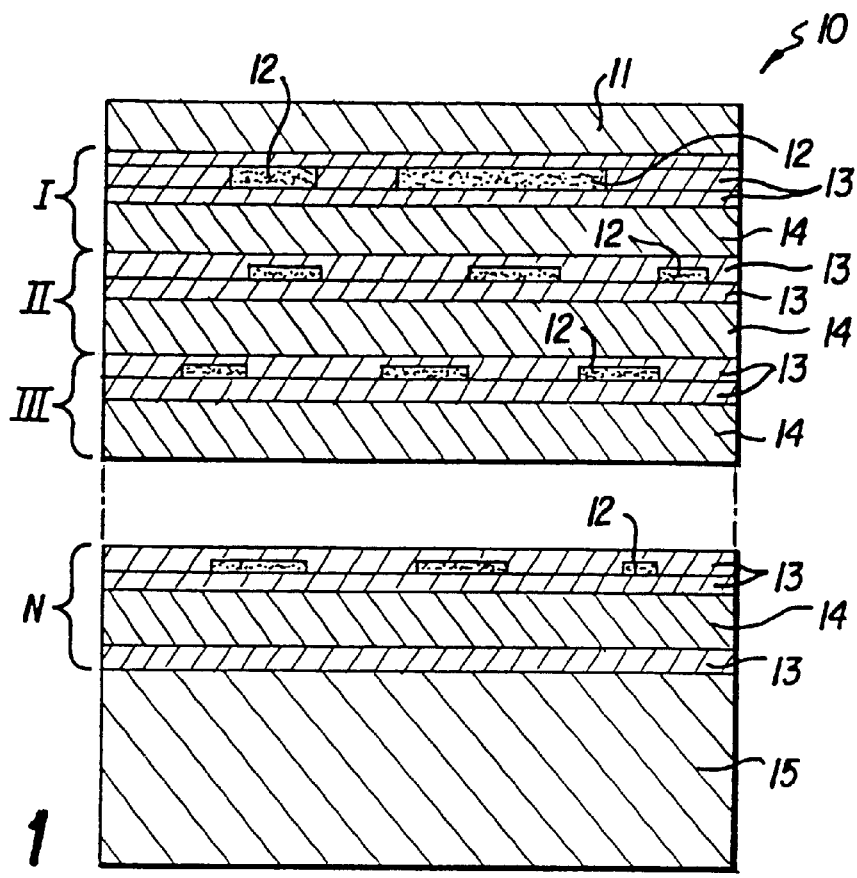
FIG. 1 is a partial cross-section view of the multi-layered optical fluorescent disc as a first embodiment of the present invention (in the case when the layer of information luminescing medium (hereinafter referred to as ILM), covering the flat surface of the photomask, is removed (washed away) after the exposure).

Photo-method of producing the multi-layered optical fluorescent disc (by the example of photo-active dyes):

1. The intermediate sublayer 2, which exhibits a transparency in the UV and visible spectrum sections, has the refractive index $n_2$ and the thickness $d_2$, and loses its adhesive properties with respect to the photomask during drying, is applied on the photomask made of the material transparent in the UV andvisible spectrum regions, with the information recorded in the form of spiral tracks. This layer may become unnecessary if a variation in the adhesive properties of the information layer, applied directly on the photomask due to various types of drying, is sufficient and will enable the treatment of the layer without its peeling from the photomask till the moment of the final drying and sticking to the carrying polycarbonate disc with the previous information and separation layers.
2. On this layer 2, the photoactive polymer layer 3 is applied in an original form having the refractive index $n_3$ and the thickness $d_3$ and capable of irreversible photo-conversion (for example, rhodamine lactams or lactones) when exposed to the radiation on the wavelength $\lambda_1$, and the colored form of which absorbs the radiation on the wavelength $\lambda_2$, and emits fluorescence on the wavelength $\lambda_3$, with $\lambda_1 < \lambda_2 < \lambda_3$.
3. Then, on layer 3, the polymer layer 4, having the refractive index $n_4$ and the thickness $d_4$ and absorbing light at the wavelength $\lambda < \lambda_4$ and being transparent on $\lambda_2$ and $\lambda_3$, with $\lambda_1 < \lambda_4 < \lambda_2 < \lambda_3$, is applied to subsequently provide the protection of the exhibited layers from the UV radiation.
4. On layer 4 is applied layer 5, having the refractive index $n_5$ and the thickness $d_5$ and being transparent on $\lambda_2$ and $\lambda_3$.
5. The resultant multi-layered structure, if it is the first one, is glued on a mechanical base in the form of the standard optical, for example, polycarbonate, disc 6 (FIG. 1), or, if this structure is the n-th structure, it is glued on the half-finished product of the optical disc with n−1 multi-layered structures, with the 5th layer of the nth structure being glued to the 2nd layer of the (n−1)th structure. If the 2nd layer is missing, then the 5th layer is glued directly onto the 3rd layer.
6. Polymerization or drying of the layers and exposure of the 3rd layer of each multi-layered structure are carried out at the most suitable moment of the described technological process.
7. Removal of the nth resultant multi-layered structure from the photomask is carried out at any moment after gluing to the (n−1)th one, for example, before gluing to it the (n+1)th multi-layered structure.
8. After the last photomask is removed, protection layer 1, having the refractive factor $n_1$ and the thickness $d_1$ and being not transparent at $\lambda < \lambda_4$ is applied on the disc.

The refractive indexes $n_1$, $n_2$, $n_3$, $n_4$, $n_5$ are selected so that to obtain $$n_1 \approx n_2 \approx n_3 \approx n_4 \approx n_5$$

If necessary, layers 2 and 4 are not applied.

9. The thickness of layers $d_1$, $d_2$, $d_3$, $d_4$, $d_5$ are selected based on the following:

$d_2$ is the minimum thickness under the condition of keeping the continuity, as a rule, $d_2 = 0.05$ μm.

$d_4$ is the minimum thickness under the condition of absorption of 99% of the incident radiation at $\lambda < \lambda_4$; as a rule, $d_4 = 1$ μm.

$d_5$ is the minimum thickness under the condition of $F_{gl} \gg F_{ad}$, where $F_{gl}$ is the force of gluing layer to layer, and $F_{ad}$ is the force of adhesion between the layer (1) and the photomask; as a rule, $d_5 = 20$–$30$ μm.

$d_1 > d_4$ $d_3$ is calculated based on the required number of dye molecules in order to provide the positive registration of the minimal information pit.

The multi-layered optical fluorescent discs with photo-affined markers are produced similarly. The main difference lies in the fact that it is necessary to perform an additional procedure of the wet treatment of the exposed photo-sensitive layer in order to remove non-fastened markers. The main advantage of this material is the possibility of using a wide range of water-soluble dyes with a photo-affined group introduced in these dyes.

The production of multi-layered fluorescent discs, by using a master-disc for the purpose of increasing productivity, can be based on the application of the replicas. These replicas are made by stamping copies from an ordinary master-disc on such material which is not susceptible to the action of the polymer solvents used in the above-mentioned method. In production of replicas is fully coincident with the production technology of the base for the DVD-type ordinary single-layer discs.

What is claimed is:

1. The method of producing the multi-layered optical fluorescent discs comprising the steps:

producing a large number of relief-forming master-discs with the information recorded on the said discs, said information being coded in the form of spirally-arranged spatially-modulated micro-cavities (pits or grooves) for each of the layers formed in the multi-layered optical disc;

preparing liquid solutions for an information luminescent medium (ILM);

applying said solutions to the said master-disc;

hardening the ILM solutions on the said master-disc;

forming, in the said hardened layer, the information-modulated pattern in the form of the nodules capable of emitting luminescence and filling the space of micro-cavities (pits or grooves) in the said master-disc on the non-luminescent flat surface of the hardened layer of the ILM;

removing said hardened layer of the ILM with the luminescent micro-nodules on a thin polymer film;

forming the multi-layered disc by means of sequential transfer of various hardened ILM from various master-discs on a stack of layers of a fluorescent optical disc; and applying a protective coating on the first layer and applying the multi-layered structure with the ILM on a substrate from the side of the last information layer.

2. The method as in claim 1 wherein the said master-disc is produced as a metallic-coated photomask on a quartz or glass substrate with pits and grooves.

3. The method as in claim 1 further including the following steps:

cleaning the substrate which is transparent in UV and visible spectrum segment;

applying a thin metal layer on the said substrate;

applying a photo-resist to said substrate;

drying the photo-resist;

exposing said photo-resist by focused and modulated laser or electronic beam when scanning spirally;

developing said photo-resist;

etching the thin metal layer;

removing said photo-resist; and depositing a metal layer by electroplating.

4. The method as in claim 3 wherein the thickness of the deposited metal layer is equal to the depth of the formed pits.

5. The method as in claim 3 wherein the thickness of the deposited metal layer is about 0.35–0.5 $\mu$m.

6. The method as in claim 3 wherein the surface of the layer accumulated by electroplating exhibits non-wetting properties with respect to the liquid solution of the ILM.

7. The method as in claim 1 wherein the liquid solution of ILM is photo-sensitive.

8. The method as in claim 1 wherein the hardened ILM layers provide transmission on the wavelength of the activating radiation not exceeding 1% at the layer depth equal to the depth of the said master-disc pit.

9. The method as in claim 1 wherein, in order to provide a strong absorption on the activation wavelength, additives with a high extinction factor are introduced into the composition of the ILM to render it light sensitive.

10. The method as in claim 1 wherein the composition of the ILM comprises photo-chemically stable molecules of luminophor.

11. The method as in claim 1 wherein the negative photoresists are included in the ILM solutions to render them light sensitive.

12. The method as in claim 11 wherein the negative photoresists comprise the polyvinyl-cyanamate derivatives.

13. The method as in claim 1 wherein photohardenable monomers or oligomers are used in the composition of the ILM.

14. The method as in claim 1 wherein photo-chemically stable polymers are present in the ILM composition.

15. The method as in claim 1 wherein light sensitive non-luminescent substances capable of forming luminescent photo-products are introduced into the composition of the ILM.

16. The method as in claim 15 wherein lactam rhodamines or other organic dyes are used as the light-sensitive substance.

17. The method as in claim 1 wherein photo-active dyes are present in the ILM.

18. The method as in claim 17 wherein lactone rhodamines or other organic dyes are the photo-active dyes.

19. The method as in claim 1 wherein fluorescent markers fastened to polymer molecules sensitive to UV radiation are present in the ILM.

20. The method as in claim 1 wherein azides are added as fluorescent markers to the ILM.

21. The method as in claim 1 wherein the formation of the information-modulated pattern coded in the form of spatially-modulated luminescent micro-cavities is performed by illuminating the ILM layer by the actinic radiation from the side of the said master-disc.

22. The method as in claim 1 wherein the non-radiated portion of the ILM located on the said master-disc surface is removed by a solvent after being exposed to the actinic radiation.

23. The method as in claim 1 wherein the substrate is non-transparent.

24. The method as in claim 23 wherein the surface of the substrate exhibits wetting properties with respect to the liquid solution of the ILM.

25. The method as in claim 1, wherein a light-insensitive composition is used as the liquid solution of the ILM.

* * * * *